Aug. 9, 1949.    M. G. TOWNSLEY    2,478,609
DEVICE FOR TESTING THE ECCENTRICITY
OF OPTICAL ELEMENTS
Filed June 29, 1946
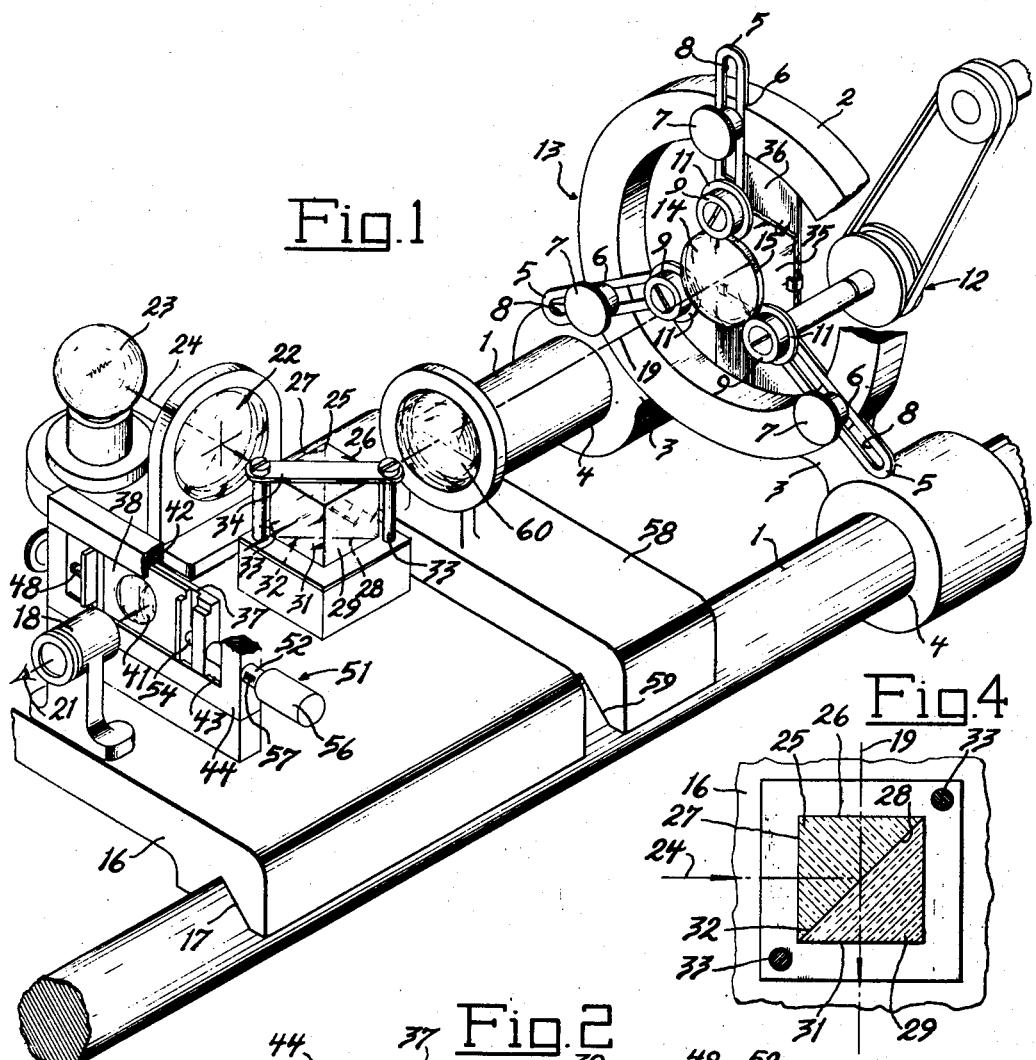
INVENTOR
MALCOLM G. TOWNSLEY
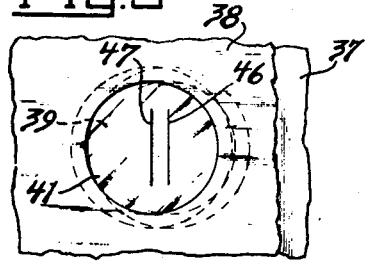
ATTY.

Patented Aug. 9, 1949

2,478,609

UNITED STATES PATENT OFFICE 2,478,609

DEVICE FOR TESTING THE ECCENTRICITY OF OPTICAL ELEMENTS

Malcolm G. Townsley, Park Ridge, Ill., assignor to Bell & Howell Company, Chicago, Ill., a corporation of Illinois Application June 29, 1946, Serial No. 680,354

3 Claims. (Cl. 88—56)

My invention relates particularly to devices for testing the eccentricity of circularly edged convergent or divergent optical elements of surface of revolution character.

In the precision manufacture of such optical elements, the elements are edged after the optical surfaces are finished, and while great care is exercised in edging the same in exact concentricity with the optical axes thereof, inaccuracies occasionally occur which go beyond permissible manufacturing tolerance.

Objects of the invention reside in the provision of a novel, effective and convenient device for testing the eccentricity of the circular edges of such optical elements, which is capable of extreme accuracy, which provides for accurately measuring any such eccentricity with a view toward accurately limiting permissible tolerance, which is relatively compact, which provides for testing optical elements of various diameters, which is conveniently adjustable for testing optical elements of different focal lengths, and which provides for testing optical elements differing in focal length throughout a relatively great range without necessitating a correspondingly great length of the device.

Further objects of the invention reside in the provision of a novel, effective and convenient device for measuring a lateral displacement or dimension of an observed image, which is particularly adapted for the aforementioned testing device, and which is capable of extreme accuracy.

The invention will be better understood by reference to the accompanying drawing forming a part hereof and in which—

Figure 1 is a perspective view of a testing device embodying my invention and having parts thereof broken away;

Figure 2 is a sectional view of the eccentricity measuring unit of the device taken substantially on the horizontal axial plane of the device;

Figure 3 is a face elevation of a portion of the eccentricity measuring unit; and Figure 4 is a section of the two optical prisms of the device, hereinafter described, taken on the horizontal axial plane of the device.

Referring to the drawing and particularly to Figure 1, a bed comprises parallel rods 1, and a frame 2, in the form of a ring, is provided with two angularly spaced radial arms 3 which terminate in bored hub portions 4 engaged on the rods 1 for the support of the frame on the rods with the axis of the frame parallel to the rods. Three support arms 5 are angularly spaced about the frame 2 in radial relation therewith and are slidably mounted in radial slots 6 of the frame for longitudinal adjustment radially of the frame, and headed screws 7 pass through longitudinal slots 8 of the support arms and are screw-threaded into the frame for securing the support arms in adjusted positions longitudinally thereof and radially of the frame.

Three parallel rollers 9 are rotatably mounted respectively on the inner ends of the support arms 5 and as so mounted, the rollers are angularly spaced about the axis and disposed inwardly of the frame 2 and have their axes parallel to the rods 1. The rollers are provided with radial flanges 11 at corresponding ends thereof which are disposed in a common plane, and one of the rollers is adapted to be driven by means of a usual belt and pulley drive means, generally designated at 12, operatively connected with this roller.

The rollers 9, together with the supporting structure thereof, provide a mounting, generally designated at 13, which is operative to carry a circularly edged convergent or divergent optical element of surface of revolution character, such as a convergent lens 14, for rotation of the lens on the axis defined by its circular edge 15 and the rollers are engaged with the circular edge of the lens circumferentially thereabout to establish rotation of the lens on this axis, the flanges 11 of the rollers serving for axially positioning the lens. The lens as so carried is rotated for the testing of the eccentricity of the same, as hereinafter described, by means of the belt and pulley means 12 driving the roller with which it is operatively connected.

The means, hereinbefore described, whereby the support arms 5 are adjustably positioned on the frame 2, constitutes adjustable mounting means operative for relatively adjustably positioning the rollers 9 radially of the frame 2 to accommodate optical elements of different diameters for test.

A base member 16 is mounted on the rods 1 for adjustment therealong by means of parallel V-grooves on the base member and respectively engaging downwardly on the rods 1, one of these grooves being designated at 17.

An image observing means in the form of a usual convergent eye piece 18 is mounted on the base 16 and is spaced along the rotational axis 19 of the mounting 13 from the lens 14 carried thereby, the rotational axis being parallel to the rods 1. The eye piece 18 is alined with the rotational axis 19 and is adapted to transmit to the observer's eye 21 an image formed by the lens 14, either by itself or in conjunction with an auxiliary lens, at the image plane of the eye piece which is disposed between the eye piece and the lens as hereinafter more fully described.

An image source means, in the forms of a reticle 22 and an incandescent electric lamp 23 illuminating the reticle, is also mounted on the base 16 and is spaced laterally from and is disposed on another axis 24 normal to and intersecting the rotational axis 19 between the lens 14 carried in the mounting 13 and the observing means comprising the eye piece 18 and its image plane.

A right angle isosceles optical prism 25 has its two plane leg faces 26 and 27 respectively disposed across the axes 19 and 24 and respectively facing the lens 14 carried by the mounting 13 and the image source means comprising the reticle 22 and lamp 23, and has its plane hypotenuse face 28 disposed equiangularly diagonally across these axes at the intersection thereof and forming a partially reflecting surface operative to reflect light from the reticle 22 to the carried lens 14. See Figures 1 and 4. A second right angle isosceles optical prism 29 is disposed between the prism 25 and the observing means comprising the eye piece 18 and its image plane and has a plane leg face 31 and the plane hypotenuse face 32 thereof disposed across the rotational axis 19 in parallelism respectively with the two faces 26 and 28 of the prism 25 which are disposed across the rotational axis and with the opposing faces of the two prisms, i. e., the hypotenuse faces 28 and 32, engaged against each other.

With reference to light passing along the rotational axis 19 and through the prisms 25 and 29, the refraction of the light by the prism 25 is offset by the opposite refraction of the light by the prism 29 so that the light has the same direction on both sides of the prisms, and where, as shown, the opposing faces of the prisms are engaged against each other the light is also alined on both sides of the prisms. Thus, the eye piece 18 which is desirably alined with the rotational axis 19 can receive light along the rotational axis from the lens 14 carried by the mounting 13. The prisms 25 and 29 are mounted on the base member 16 by means of two headed screws 33 vertically clamping the prisms between a clamp member 34 and the base member.

A plane reflecting element 35 is disposed across the rotational axis 19 in normal relation therewith and at the side of the lens 14 carried by the mounting 13 opposite that on which the prisms 25 and 29 are disposed, this reflecting element being mounted on a plate 36 extending across the opening of the frame 2 and secured on the frame. The reflecting element 35 is directed toward the eye piece 18 and is thus operative to return light through the lens 14 carried by the mounting 13 from the image source means comprising the reticle 22 and lamp 23, along the rotational axis 19 for the reception of the returned light by the image observing means comprising the eye piece 18 and its image plane.

The plane of the reticle 22 and the image plane of the eye piece are equally optically spaced from and are so optically related with the lens 14 carried by the mounting 13 that the lens collimates the light received from the reticle and forms an image of the reticle at the image plane of the eye piece 18. The lens 14 is rotated in the mounting 13 during the testing thereof for the observance of the lateral stability of the image formed by the lens during rotation thereof, and, if any eccentricity exists between the circular edge 15 and the optical axis of the lens, such eccentricity is evidenced by lateral movement of the image, which is observed through the eye piece 18, to a degree proportional to the degree of eccentricity.

Due to the reticle 22 and the eye piece being disposed on the same side of the optical element or lens 14 under test, the necessary length of the device is reduced, and in addition the device is adapted for testing the eccentricity of circularly edged reflectors as hereinafter described.

Two carrier plates 37 and 38 have flat transparent gauge members 39 and 41 respectively mounted thereon and disposed correspondingly with the planes thereof. The carrier plates and the gauge members are arranged in superposed relation and as so arranged the carrier plates are mounted for independent adjustment in their planes in spaced opposing slide bearings 42 and 43 of a bearing frame 44 fixed on the base member 16. See Figure 2. As so mounted, the gauge members 39 and 41 have their opposing faces disposed at the image plane of the eye piece 18, said image plane being designated at 45 in Figure 2, and are independently correspondingly adjustable in correspondence with said image plane. The gauge members are respectively provided with gauge marks 46 and 47, see Figure 3, which are observable through the eye piece 18 and which indicate relative adjustment of the gauge members.

A headed screw 48 is screw threaded through the frame 44 in alinement with the movement of the carrier plates 37 and 38 and abuts the carrier plate 37, and a leaf spring 49 is operative between the frame 44 and the carrier plate 37 to maintain this plate in engagement with the screw, so that the screw serves to conveniently adjust this plate in either direction. A micrometer head 51 of usual construction has its axis in alinement with the movement of the carrier plates 37 and 38 and has its body 52 fixed with the carrier plate 37, as designated at 53, and has its spindle 54, which as usual is screwthreaded in the body 52, abutting the carrier plate 38, and a leaf spring 55 is operative between the carrier plates 37 and 38 to maintain the plate 38 in engagement with the micrometer spindle 54, so that the micrometer serves to conveniently relatively adjust the carrier plates in either direction. The spindle head 56 of the micrometer head, by means of which the spindle 54 is rotated to relatively adjust the carrier plates, cooperates with a usual scale 57 on the body 52 to accurately measure the separation of the gauge marks 46 and 47 of the gauge members 39 and 41 in the relative adjustment of the gauge members.

In the testing of a lens 14 carried by the mounting 13, the base 16 having been adjusted relative to the mounting for the formation of an image of the reticle 22 at the image plane of the eye piece 18 by the lens 14, the image is observed through the eye piece during rotation of the lens on the axis defined by its circular edge 15, and during such observance the gauge member 39 is adjusted by rotation of the screw 48 to bring the gauge mark 46 into gauging relation with the image, after which, if there is any lateral movement of the image, the gauge member 41 is adjusted relative to the gauge member 39 by rotation of the spindle 54 of the micrometer head to space the gauge mark 47 from the gauge mark 46 a distance equal to that of the lateral movement of the image, the spindle head 56 cooperating with the scale 57 to accurately measure such distance and consequently the degree of lateral movement of the image.

It is obvious that the measuring device including the gauge members 39 and 41 may also be utilized to measure a dimension of an image.

As shown in Figure 1, another base member 58 is mounted on the rods 1 for adjustment therealong by means of V-grooves on this base member and respectively engaging downwardly on the rods 1, one of these grooves being designated at 59. An auxiliary lens 60, preferably of spherical surface of revolution character, is mounted on the base member 58 and is disposed across the rotational axis 19 between the prism 25 and the lens 14 carried by the mounting 13. The auxiliary lens 60 is adjustable relative to the mounting 13 and the base member 16 along the rotational axis 19 for the purpose of focusing by reason of the base member 58 being adjustable along the rods 1.

The auxiliary lens 60 is selectively used where the focal length of the lens 14 under test is such that it could not otherwise be accommodated within the available length of the device, the base 58 and with it the auxiliary lens 60 being removable from functioning position. The auxiliary lens 60 as used for this purpose may be either convergent, as shown, or divergent, depending upon the lens 14 under test having a focal length respectively too long or too short to be accommodated within the available length of the device, and is operative to place a virtual image of the reticle 22 at the principal focus of the lens 14 and thereby extends the range of focal lengths of lenses which may be accommodated for test within the available length of the device. When the auxiliary lens 60 is not used, the lens 14 is placed at its focal length from the plane of the reticle 22 and the image plane of the eye piece 18.

The base member 16 is adjustable relative to the mounting 13 along the rotational axis 19 by reason of it being adjustable along the rods 1, and inasmuch as the base member 16 carries the reticle 22 and its lamp 23, the eye piece 18, the prisms 25 and 29, and the measuring means including the relatively adjustable gauge members 39 and 41, these elements are conveniently adjustable as a unit relative to the mounting 13 along the rotational axis 19 for accommodating optical elements of different focal lengths for test by corresponding adjustment of the base member 16.

The device, in addition to being adapted for testing circularly edged convergent lenses of surface of revolution character such as the lens 14, is also adapted for testing other circularly edged optical elements of surface of revolution character such as divergent lenses and concave and convex, i. e., respectively convergent and divergent, reflectors, such other optical elements being carried for rotation during test in the mounting 13 in the same manner as is a convergent lens 14, and if a reflector is being tested, its reflecting surface is directed toward the eye piece 18 and thus serves the same purpose as and is the equivalent of the reflecting element 35 in returning the light received from the reticle 22 along the rotational axis 19 for the reception of the returned light by the eye piece 18.

In testing a divergent lens element, a convergent auxiliary lens 60 is always used and is so placed with respect to its principal focus, the plane of the reticle 22, the image plane 45 of the eye piece 18 and the carried divergent lens element under test which has a principal focus thereof disposed to the rear of the reflecting surface of the reflector 35, that the auxiliary lens forms an image of the reticle at the said principal focus of the divergent lens element under test, which image becomes a virtual object for the divergent lens element and is imaged at infinity thereby, that in conjunction with the reflector 35 returning the light from the resulting infinitely distant image to the divergent lens element, the divergent lens element forms of this latter image a virtual image at its said principal focus, and that this virtual image forms a real object for the auxiliary lens 60 and is imaged thereby as a real image at the image plane 45 of the eye piece 18.

In the testing of concave i. e., convergent, reflectors, an auxiliary lens 60, either convergent or divergent, is selectively used to accommodate such reflectors having focal lengths which could not otherwise be accommodated within the available length of the device as hereinbefore described with reference to a convergent lens 14, and where a concave reflector is under test and an auxiliary lens 60 is not used the reflector under test is placed at twice its focal length from the plane of the article 22 and the image plane of the eye piece 18.

In testing a convex, i. e., divergent, reflector, a convergent lens 60 is always used and is so placed with respect to its principal focus, the plane of the reticle 22, the image plane 45 of the eye piece 18 and the carried divergent reflector under test, that the auxiliary lens forms an image of the reticle at twice the focal length of the divergent reflector under test to the rear of the reflecting surface thereof so as to be a virtual object of the divergent reflector. The divergent reflector will then produce a virtual image of this virtual object in the same plane as the virtual object. This virtual image forms a real object for the auxiliary lens 60, and the auxiliary lens images this real object as a real image at the image plane 45 of the eye piece 18.

In all cases where an auxiliary lens 60 is used, it is operative in conjunction with the optical element under test to form an image of the reticle 22 at the image plane of the eye piece 18 for the observance of the lateral stability of the image during rotation of the optical element under test.

While I have thus described my invention, I do not wish to be limited to the precise details described, as changes may be readily made without departing from the spirit of my invention, but having thus described my invention, I claim as new and desire to secure by Letters Patent the following:

1. In a device for testing the eccentricity of circularly edged convergent or divergent optical elements of surface of revolution character, the combination of a mounting operative to carry such an optical element for rotation on the axis defined by the circular edge of said optical element and circumferentially engageable with said edge to establish rotation of said optical element on said axis, an image source means and an image observing means, a first of said two means being spaced along the rotational axis of said mounting from such an optical element carried by said mounting and the second of said two means being spaced laterally from said rotational axis and disposed on another axis intersecting said rotational axis between said carried optical element and said first means, a partially reflecting element having its partially reflecting surface disposed diagonally across said intersecting axes at the intersection thereof and positioned to reflect light between said second means and said carried optical element and a second reflecting element disposed across said rotational axis at the side of said carried optical element opposite that on which said partially reflecting element is disposed and directed toward said partially reflecting element to return light received from said image source means along said rotational axis for the reception of the returned light by said image observing means, said image source means and said image observing means being so optically related with said carried optical element that an image of said image source means is formed at the image plane of said image observing means for the observance of the lateral stability of said image during said rotation of said carried optical element.

2. In a device for testing the eccentricity of circularly edged convergent or divergent optical elements of surface of revolution character, the combination of a mounting operative to carry such an optical element for rotation on the axis defined by the circular edge of said optical element and circumferentially engageable with said edge to establish rotation of said optical element on said axis, an image source means and an image observing means, a first of said two means being spaced along the rotational axis of said mounting from such an optical element carried by said mounting and the second of said two means being spaced laterally from said rotational axis and disposed on another axis intersecting said rotational axis between said carried optical element and said first means, an optical prism provided with three triangularly related plane faces of which two faces are respectively disposed across said intersecting axes and respectively face said second means and said carried optical element and of which the third face is disposed diagonally across said intersecting axes at the intersection thereof and forms a partially reflecting surface positioned to reflect light between said second means and said carried optical element, a second optical prism disposed between said first means and said first mentioned prism and provided with two convergently related plane faces disposed across said rotational axis in parallelism respectively with the two faces of said first mentioned prism which are disposed across said rotational axis and with the opposing faces of said two prisms engaged against each other, and a plane reflecting element disposed across said rotational axis in normal relation therewith and at the side of said carried optical element opposite that on which said prisms are disposed and operative to return light received from said image source means along said rotational axis for the reception of the returned light by said image observing means, said image source means and said image observing means being equally optically spaced from and so optically related with said carried optical element that an image of said image source means is formed at the image plane of said image observing means for the observance of the lateral stability of said image during said rotation of said carried optical element.

3. The combination as recited in claim 2 and further characterized in that a base member has mounted thereon said image source means, said image observing means and said optical prisms, and a support is common to said base and said mounting and is adjustably related to one thereof longitudinally of said rotational axis.

MALCOLM G. TOWNSLEY.

REFERENCES CITED

The following references are of record in the file of this patent:

UNITED STATES PATENTS

| Number | Name | Date |
| --- | --- | --- |
| 996,017 | Haynes | June 20, 1911 |
| 1,309,359 | Kellner | July 8, 1919 |
| 1,593,053 | Ames | July 20, 1926 |
| 1,759,914 | Pilny | May 27, 1930 |
| 1,918,556 | Pfau | July 18, 1933 |

OTHER REFERENCES

Deve: "Optical Workshop Principles," 1943, supplied by Jarrell-Ash Co., 165 Newbury Street, Boston, Mass. 306 pp.—pp. 215, 252, 253, 254, 255 and 256 esp. cited.